United States Patent [19]

Smyly, Sr.

[11] Patent Number: 4,972,794

[45] Date of Patent: Nov. 27, 1990

[54] FLAGSTAFF WITH PROTECTIVE HOUSING

[76] Inventor: George M. Smyly, Sr., 1903 Carlton St., North Charleston, S.C. 29405

[21] Appl. No.: 464,034

[22] Filed: Jan. 12, 1990

[51] Int. Cl.[5] .......................... G09F 17/00; G01D 5/00

[52] U.S. Cl. .................................... 116/173; 116/282; 116/283

[58] Field of Search ............... 116/173, 174, 281, 282, 116/283, DIG. 4; 40/601

[56] References Cited

U.S. PATENT DOCUMENTS

| | | | |
|---|---|---|---|
| 765,427 | 7/1904 | Herrick | 116/174 |
| 1,013,582 | 1/1912 | Bedini | 116/283 |
| 2,441,875 | 5/1948 | Faber | 116/173 |
| 3,417,732 | 12/1968 | Platt | 116/173 |
| 3,675,616 | 7/1972 | McInnis | 116/173 |
| 4,800,834 | 1/1989 | Feng | 116/174 X |

*Primary Examiner*—Allan N. Shoap
*Assistant Examiner*—J. Folker

[57] ABSTRACT

A method for honoring the Flag and Nation for which it stands is accomplished by having a weather cap and protective flag housing upon a flag staff such that a cabling and winching system will, via a pulley and barring supporting, spring-return, slidingly captured, internal staff insert, move the housing and insert in opposite directions along the staff, the housing enveloping the Flag, the Flag being furled along the staff by a flag attached, flying flag cord passing through the moving ring, until the housing mates with the weather cap, protecting the Flag. Reversing the winch lowers the housing, permits the spring-return insert to move, unfurling the Flag, thus honorably displaying the Flag.

9 Claims, 3 Drawing Sheets

FLAGSTAFF WITH PROTECTIVE HOUSING

BACKGROUND OF THE INVENTION

1. Field of the Invention

The present invention relates to honorably, properly displaying and protecting the Flag of the United States of America. More specifically, the present invention relates to displaying and protecting the Flag at locations previously considered to be inconvenient, and where personnel are neither available nor qualified to raise, lower, properly fold, and protect the Flag.

2. Prior Art

Following are only several necessary interpretations of the Flag Code set by the United States Congress to include: displaying the Flag from sunrises to sunset, and at night if lighted, not displaying the Flag during bad weather conditions, especially displaying the Flag on national and state holidays to include Independence Day, Constitution Day, Flag Day, Armed Forces Day, Memorial Day, Washington's Birthday, New Year's Day, Inauguration Day, Lincoln's Birthday, Labor Day, Columbus Day, Veterans Day, New Year's Day, state birthdays, and Thanksgiving Day.

Most often, the Flag is flown from a vertical flag staff, whereby, inadvertently, the Flag Code is often violated during Flag raising and lowering ceremonies, even when the flag staff is conveniently located. There is a patriotic need to display the Flag at more locations, especially above structural places of business.

The present invention is directed at the staff method of displaying the Flag, wherein, the Flag is partially furled downward along the staff such that the furled Flag and flag contacting surface of the staff can be enclosed by an upwardly traveling, staff mounted, protective housing, and wherein lowering the protective housing will unfurl and display the Flag.

No method is known that will encourage the installation of a maintenance free, flag displaying, flag protecting device at locations previously considered to be inconvenient, or impractical, and where personnel are not available for Flag Raising/Lowering Ceremonies.

SUMMARY OF THE INVENTION

An object of the present invention is to honorably display the Flag at locations above structures, the locations previously considered to be impractical, inaccessible, unlikely, unmanageable, or simply inconvenient.

Another object of the present invention is to enclose and protect the Flag upon the flag upon the flag staff without the necessity of a Flag Raising/Lowering Ceremony.

Importantly, another object of the present invention is that in no way will the device undermine the Patriotic importance of Flag Raising/Lowering Ceremonies.

Yet, another object of the present invention is to have automatic, or push-button, control over honorably displaying and protectively enclosing the Flag.

A further object of the present invention is to prevent any violations of the Flag Code as established by the United States Congress.

Briefly, the foregoing objects can be accomplished by providing a flag staff having a weather cap secured at the top thereof, and such that a dual purpose cable and winching system will raise and lower, along the staff, a protective, furled flag enveloping housing. Furling the Flag is accomplished by having a flying, flag furling cord extending from the flag staff attached lower corner of the flag to the mid point at the lower, red stripe, edge of the Flag such that an extended bar ring, the ring encircling the flying flag furling cord, will furl the flag downward along the staff by having the bar ring attached to a vertically traveling spring return pulley supporting insert, the insert being moved downward by the mentioned cable and winching system. The force of gravity, in conjunction with the spring return of the insert, will provide means for lowering the housing and unfurling the Flag, after which the Flag will be honorably displayed.

BRIEF DESCRIPTION OF THE DRAWINGS

Other objects and intended advantages of this invention will be readily appreciated as the same becomes better understood by reference to the following detailed description when considered in connection with the accompanying drawings wherein.

DETAILED DESCRIPTION OF THE PREFERRED EMBODIMENTS

Figure 1:
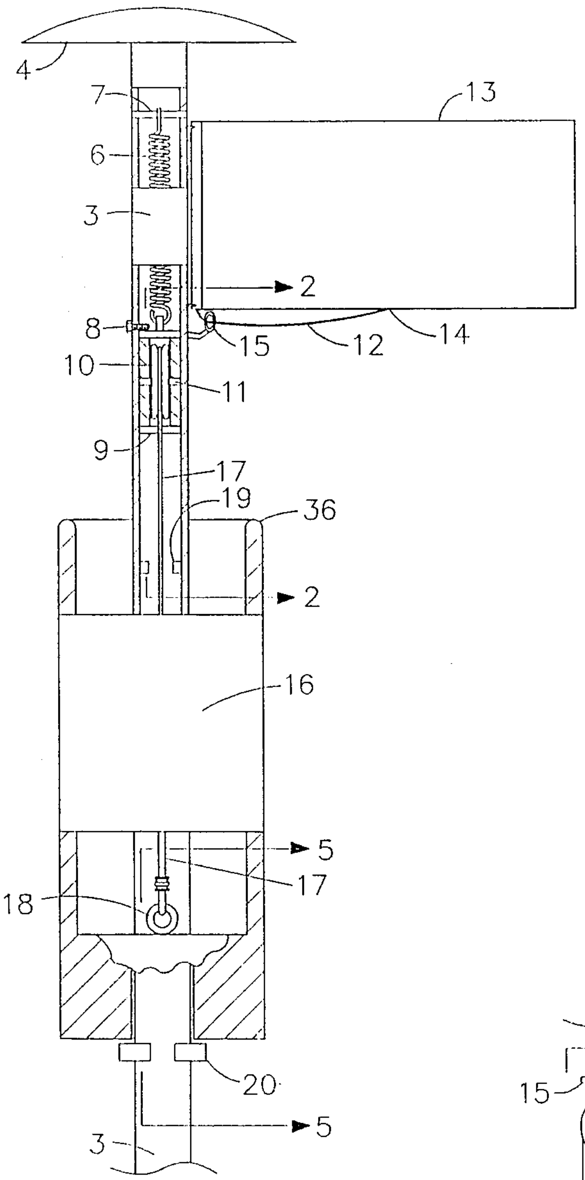
FIG. 1 is a fragmentary, partial sectional view of the device, omitting components below the protective housing stops.
Figure 8:
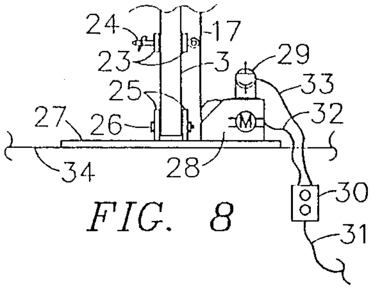
FIG. 8 is a partial plane view showing the pivotally mounted, and braced, flag staff, to include the winch, photo-electric cell, and control box.

Referring now in greater detail to the various figures of the drawings, wherein the major components of the invention are generally shown in FIGS. 1 and 8, the remaining eight drawing figures providing the necessary detailed views of related functions of the invention components.

Viewing FIG. 1, and throughout this description, it is to be understood that the preferred flag staff 3 is a corrosion resistant, rigid, elongated, hollow, cylindrical metal tube, and, as will hereinafter appear, this tubular staff 3 is adapted, or modified, to permit movable components to function within and upon the same. The hereinafter described flag housing 16 is preferably composed of a rigid plastic material, PVC being a preferred choice material.

Figure 2:
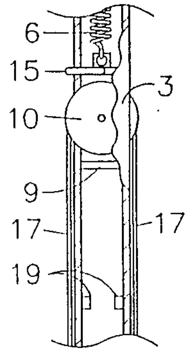
FIG. 2 is a partial sectional view taken along the line 2—2 of FIG. 1.
Figure 3:
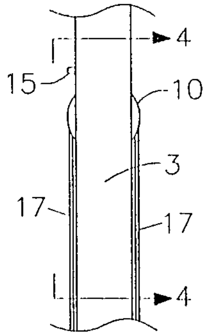
FIG. 3 is a plane view of FIG. 2.
Figure 4:
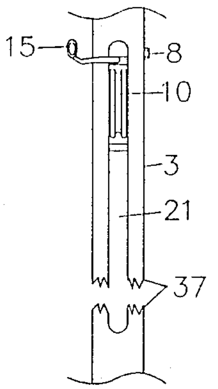
FIG. 4 is a plane view taken along the line 4—4 of FIG. 3, with the addition of the preferred weld location around separated flag staff components.

Within the hollow staff 3 is a spring 6 return, pulley 10 supporting, slidingly captured insert 9 having outer surfaces registrable with inner surfaces of the staff 3. Upward, spring 6 induced movement of the insert 9 is limited by the preferred stop bolt 8, the stop bolt 8 being disposed within a pre-drilled, tapped hole such that the stop bolt 8 is located on the opposite side of the staff from the fixedly attached flag, and, the downward movement of the insert 9 is limited by the heavy duty, staff inner surface secured stop 19. The preferred stop 19, shown in FIGS. 1 and 2, is a thick, circular washer welded to the inner surface of the staff 3. Viewing FIG. 4, the staff 3 must be separated prior to installing the mentioned spring return insert and the mentioned welded stop. It is preferred that the two separated members of the staff be rejoined by the welding of a safe, piping weld bead. The insert 9 return spring 6 has one end, this end being understood as the upper end thereof, fixedly attached to the inner staff lateral spring support bar 7 and the other end thereof centrally attached to a small cleat at the upper, central surface of the movable insert 9. Viewing FIGS. 1, 2 and 3, the insert 9 supported pulley 10 is rotatingly maintained upon the insert pulley shaft 11, the diameter of the pulley 10 being dimensioned such that portions of the pulley 10 near the outer perimeter thereof protrudes from within the staff. As best shown in FIGS. 3 and 4, the protruding portions of the pulley 10 are maintained, in a slidingly trapped position, within elongated grooves 21 machined longitudinally along opposite sides of the staff 3.

Viewing FIGS. 1, 3, 5 and 8, the winch cable 17 is shown having an end thereof fixedly attached to the inner bottom surface of the housing 16. The cable 17 extends upward from the housing attachment point, traines about the insert pulley 10, extends downward from the pulley, passing through a clear opening 22 in the bottom of the housing, and terminates at the winch 28.

Viewing FIGS. 1, 2, 3, 4 and 6, a bar ring 15 is show solidly secured to the insert 9, the bar ring 15 being a component thereof. As best shown in FIGS. 1 and 4, the bar ring 15 unites with the insert 9 at a point slightly above the pulley 10 component of the insert and extends, curvingly, outward through one of the mentioned longitudinal staff grooves such that the curved portion of the bar ring 15 remains in close proximity to the circular outer surface of the staff 3 and such that the ring portion of the bar ring 15 is positioned directly below the lower, staff attached corner of the flag.

At this point in the description, it should be understood that the flag 13 is attached to the flag staff 3 using whatever means one may choose, however, the attached edge of the flag should be very near the flag staff 3. This is not a conventional flag. The preferred lower edge, being below, or integrated with, the red stripe on the United States Flag, must be composed of a very durable, strong, flexible and smooth fabric, especially that portion of the flag extending from the staff 3 to the lower edge mid point 14 of the flag.

Figure 6:
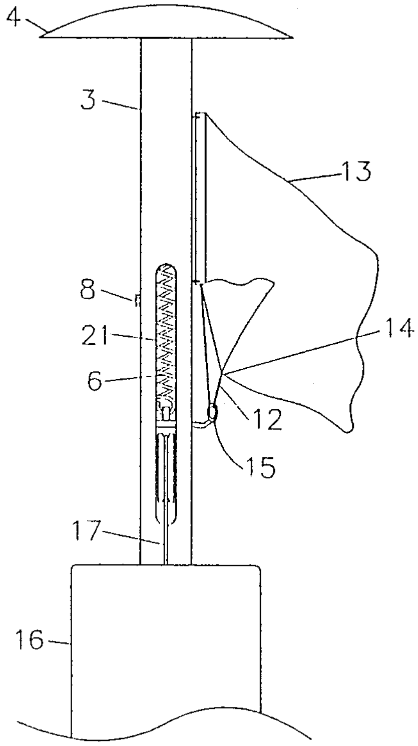
FIG. 6 is a partial plane view showing the furled flag as the protective housing begins to envelope the same.

Viewing FIGS. 1 and 6, the flying, flag furling cord 12 is shown passing through the ring portion of the bar ring 15 as it extends from the lower flag staff corner of the flag to the lower edge mid point 14 of the flag. The preferred flag furling cord 12 is also comprised of a durable, strong and smooth cord material and the cord 12 is preferably sewn, each end thereof, to the flag 13 using rough, or heavy, duty stitching means. It is important to know that this smooth surfaced furling cord 12 is not so flexible as to become inadvertently entangled.

Figure 7:
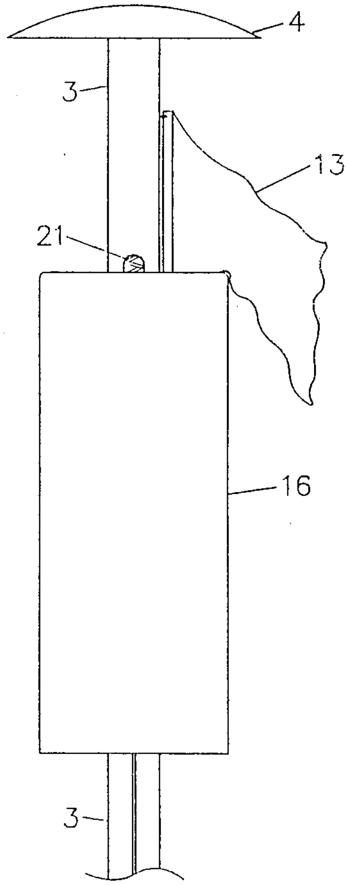
FIG. 7 is a view similar to FIG. 6 showing the furled flag partially enclosed by the upward traveling protective housing.

As best shown in FIGS. 1, 6 and 7, when the insert 9, understood to be stretching the insert return spring 6, is forced downward upon the sturdy stop 19, the ring portion of the bar ring 15 and the flag furling cord 12, together, function to somewhat furl the flag downward along the flag staff 3. This downward furling of the flag permits the use of a longitudinally more compact flag housing 16. The preferred flag housing 16 is an elongated, partially hollow cylinder having an opening at the top thereof and having the top edges around the opening thereof rounded and smooth such that the mentioned flag can be literally dragged into the hollow space, FIG. 7, the flag experiencing a minimum of entrance resistance. The flag housing 16 is shown slidingly captured upon the flag staff 3 such that the housing 16 surroundingly envelopes the staff 3 as the staff 3 passes through the hollow central portion of the housing and through a close tolerance elongated opening at the central lower portion of the housing 16, this close tolerance staff entrance aperture providing means for maintaining vertical alignment of the housing 16 upon the staff 3. The staff 3 and housing 16 are concentric about a common longitudinal axis. The staff 3 outer surface, solidly, fixedly secured stop component 20 limits the lowering distance of the housing 16. It is preferred that the stop 20 have a suitable curved shape, conforming to the curvature of the staff, the stop 20 being solidly welded in place.

Viewing FIGS. 1, 6, 7 and 10, a preferred corrosion resistant, concavity shaped weather cap 4 is shown preferably welded upon the top of the staff 3 such that this weather cap 4 provides three functions, the three functions consisting of limiting the upward movement of the housing 16, weather protecting the enclosed flag when the the housing 16 is mated with the weather cap 4, and providing a platform for securing a preferred standard 35, or emblem 35, thereupon.

Figure 9:
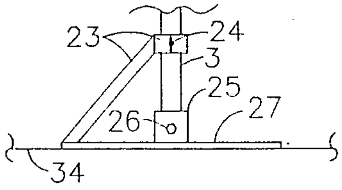
FIG. 9 is a left side view of FIG. 8, omitting the winch, photo-electric cell, cable, and control box, showing the staff brace, staff/winch support platform, and the bracketed, pivotally secured staff.
Figure 10:
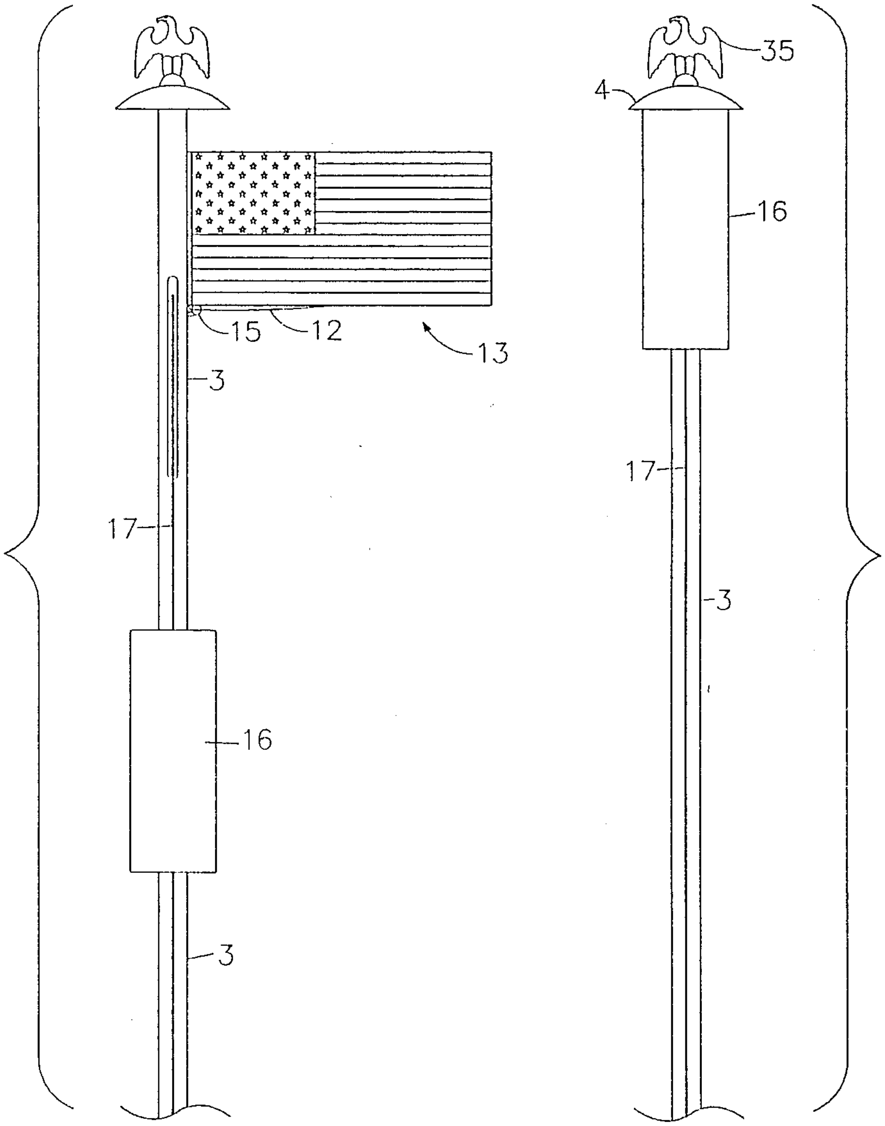
FIG. 10 is a partial plane view showing both the honorably displayed Flag and the enclosed, protected Flag.

Viewing FIGS. 8 and 9, the flag staff 3 is shown pivotally secured between platform 27 brackets 25, and having the diagonal platform brace 23 maintaining the staff 3 in the vertical position. A preferred heavy duty bolt 26, having a locking nut, provides the mentioned pivot point by passing through drilled holes in the brackets 25 and the flag staff 3, and a preferred removably inserted heavy duty safety pin 24 is disposed through drilled holes in the bifurcated portion of the brace 23 and the related portion of the flag staff 3.

Figure 5:
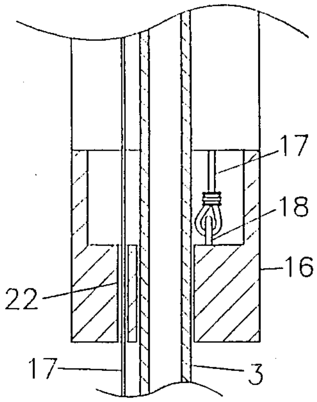
FIG. 5 is a partial sectional view taken along the line 5—5 of FIG. 1.

Viewing FIGS. 1, 5 and 8, an electrical, reversible winch 28 is shown as being fixedly attached upon the staff support platform 27 such that when the cable 17 is pulled, by winching, the insert 9, having the winch cable 17 trained about the mentioned insert pulley 10, is moved to the mentioned lower stop 19 as the insert return spring 6 is stretched, the flag being furled in the process. Upon the insert 9 contacting the lower stop 19, the housing is lifted from the stop 20 and moves upwardly along the staff 3, enveloping the furled flag, until mated with the weather cap 4.

Reversing the winch, unwinding the cable, allows the force of gravity to lower the housing upon the housing stop. Continued unwinding of the cable allows the insert return spring to lift the insert until stopped by the upper bolt stop, the flag being unfurled in the process, the spring having predetermined proper stretching properties.

Viewing FIG. 8, the preferred reversible electric winch 28 has electrical wiring 32 extending to a preferred raise/lower control panel 30, the winch, via the panel, being served by a power source wire 31. A preferred photoelectric cell is mounted, shown winch mounted, and having electrical communication 33 with the control panel 30. A person skilled in the art would be able to adjust photoelectric control additions such as to predetermine sunrise to sunset display of the flag.

A person skilled in the art would be able to pivotally secure and brace the flagstaff upon a plate, or platform, with the plate, or platform, being mounted to suit specific mounting locations and requirements.

Several alternate, and also preferred, items need to be included as the end of this description approaches. These are: the mentioned staff and housing need only be sufficiently hollow to allow the device components to function as described; the mentioned stitched cord can have means for having one end thereof removably attached near the lower, staff attached corner of the flag providing a handy method for passing the cord of a replacement flag through the mentioned ring; a less costly unidirectional winch having means for feeding out the mentioned cable can be substituted for the reversible winch; and winching means could, of course, be manual.

The invention, as described, is not limited to a vertical flag staff. If the force of gravity is insufficient, then a spring, or other return methods, could be added to the device such that it would produce the desired results even though the flag staff is positioned in a non-vertical position.

In light of the foregoing teaching, a person skilled in the art would be able to design and construct a very expensive and more complicated device by providing a rapidly accelerating rotational spin of a flag staff as a means for furling the flag about the staff, and means to reverse the rotation of the staff a sufficient number of turns to unfurl the flag. Also, the flag staff and attached flag could be designed such that the same could be lowered into a stationary housing, and, baring cost, the device could be remote controlled, have a rain detector, have night lights installed, and have timers installed.

The Flag of the United States of America has been more particularly mentioned in the foregoing Specification. However, it is to be understood that any flag, or the like, could be honorable displayed and protected by the use of this invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A flag displaying/protecting device comprising:

(a) a sufficiently hollow, rigid, elongated vertical staff having a weather cap and flag fixedly attached thereto;

(b) a spring-return, pulley supporting insert slidingly captured within said staff, said insert having a bar-ring component, said bar-ring and portions of said pulley protruding from longitudinal grooves along opposite sides of said staff, vertical movement of said insert being limited by upper and lower stops within said staff;

(c) a cord having one end removably attached near the lower, staff attached corner of said flag, the other end thereof being stitched to the lower edge midpoint of said flag, said cord passing through ring of said bar-ring;

(d) an elongated, sufficiently hollow housing slidingly captured upon said staff, said housing and said staff being concentric about a common longitudinal axis, said housing having an opening at the upper end thereof, said weather cap and an external stop upon said staff limiting vertical movement of said housing;

(e) a cable fixedly attached within and at the lower end of said housing, said cable extending from within said housing and training about said pulley, said cable now extending from said pulley and passing through an opening at said lower end of said housing; and (f) reversible winching means, pulling said cable, causing downward movement of said insert, stretching said spring, until said insert contacts said lower stop, said movement causing said flag to be furled, via said cord and ring, along said rod, continued winching now causing upward movement of said housing and envelopment of said furled flag, said housing mating with said weather cap, reversing said winching means causing gravitational movement of said housing until said housing contacts said external stop, continued said reverse winching permitting upward movement of said spring-return insert until said insert contacts said insert upper stop, said flag being unfurled and displayed.

2. The flag displaying/protecting device according to claim 1, wherein said staff is pivotally secured and braced upon a support platform.

3. The flag displaying/protecting device according to claim 1, which includes additional means for lowering said housing in a non-vertically positioned device.

4. The flag displaying/protecting device according to claim 1, wherein said reversible winching means is remotely and automatically controlled.

5. The flag displaying/protecting device according to claim 1, wherein said winching means is a manual winch.

6. An honorable flag displaying/protecting device comprising: an elongated, vertical, cylindrical flag staff having a weather cap and flag fixedly attached thereto; means for pivotally securing and bracing said staff upon a support platform; a spring-return, pulley supporting insert slidingly captured within said staff, said insert having outer surfaces registrable with inner surfaces of said staff, said insert having a bar-ring component, said bar-ring and portions of said pulley protruding from longitudinal grooves along opposite sides of said staff, vertical movement of said insert being limited by upper and lower stops within said staff; a cord having one end removably attached near the lower, staff attached corner of said flag, the other end thereof being stitched to the lower edge midpoint of said flag, said cord passing through ring of said bar-ring; means for having an elongated, cylindrical housing slidingly captured upon said staff, said housing and said staff being concentric about a common longitudinal axis, said housing having an opening at the upper end thereof, said weather cap and an external stop upon said staff limiting vertical movement of said housing; a cable fixedly attached within and at the lower end of said housing, said cable extending from within said housing and training about said pulley, said cable now extending from said pulley and passing through an opening at said lower end of said housing; and reversible winching means, pulling said cable, causing downward movement of said insert, stretching said spring, until said insert contacts said lower stop, said movement causing said flag to be furled, via said cord and ring, along said rod, continued winching now causing upward movement of said housing and envelopment of said furled flag, said housing mating with said weather cap, reversing said winching means causing gravitational movement of said housing until said housing contacts said external stop, continued said reverse winching permitting upward movement of said spring-return insert until said insert contacts said insert upper stop, said flag being unfurled and displayed.

7. The honorable flag displaying/protecting device according to claim 6, wherein said reversible winching means is remotely and automatically controlled.

8. The honorable flag displaying/protecting device according to claim 6, wherein said winching means is a manual winch.

9. The honorable flag displaying/protecting device according to claim 6, wherein a unidirectional winch having means for "feeding out" said cable is substituted for said reversible winching means.

* * * * *